(12) United States Patent
Ha et al.

(10) Patent No.: US 9,177,234 B2
(45) Date of Patent: Nov. 3, 2015

(54) PRINT CONTROLLING TERMINAL APPARATUS, PRINT CONTROLLING METHOD, IMAGE FORMING APPARATUS, AND METHOD OF CONTROLLING FOR ANALYZING STATE INFORMATION

(71) Applicant: Samsung Electronics Co., Ltd, Suwon-si, Gyeonggi-do (KR)

(72) Inventors: Yun-mi Ha, Suwon-si (KR); Young-soo Han, Yongin-si (KR); Yong-in Eom, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/934,464

(22) Filed: Jul. 3, 2013

(65) Prior Publication Data

US 2014/0104632 A1    Apr. 17, 2014

(30) Foreign Application Priority Data

Oct. 11, 2012   (KR) .................. 10-2012-0113125

(51) Int. Cl.
*G06K 15/00* (2006.01)
*G06F 3/12* (2006.01)

(52) U.S. Cl.
CPC ............. *G06K 15/40* (2013.01); *G06F 3/1204* (2013.01); *G06F 3/1207* (2013.01); *G06F 3/1229* (2013.01); *G06F 3/1285* (2013.01); *Y02B 60/1271* (2013.01)

(58) Field of Classification Search
USPC ................................. 358/1.13, 1.15
See application file for complete search history.

(56) References Cited

U.S. PATENT DOCUMENTS

2006/0007487 A1\*  1/2006  Okazawa ............... 358/1.15
2009/0096621 A1   4/2009  Ferlitsch
2009/0251731 A1\* 10/2009  Kobayashi et al. ....... 358/1.15

FOREIGN PATENT DOCUMENTS

EP           0654757          5/1995

OTHER PUBLICATIONS

Extended European Search Report issued in Application No. 13187448.9 on May 8, 2014.

\* cited by examiner

*Primary Examiner* — Qian Yang
(74) *Attorney, Agent, or Firm* — Staas & Halsey LLP

(57) ABSTRACT

The present inventive concept relates to a print controlling terminal apparatus, print controlling method, image forming apparatus and method of controlling the same. The print controlling terminal apparatus according to the present inventive concept includes a user interface unit which inputs a set value determining whether or not to activate a state information analyzing operation of the image forming apparatus, storage unit which stores the input set value, print data generating unit which generates print data including the set value and spools the generated print data to the image forming apparatus, and a control unit which generates a notification message using the received state information according to the set value.

9 Claims, 14 Drawing Sheets

Samsung CLX-6260 Series XPS

| Basic | Advanced | Security | About |

510 {
Job Accounting — Off
User ID — ym.ha
Password(4-32 Alphanumeric) — [ ]
☐ Use the User ID only 520 {
Notification
Notification type
- Error — 521
- Error and Warning — 522
- None — 523

PRINT CONTROLLING TERMINAL APPARATUS, PRINT CONTROLLING METHOD, IMAGE FORMING APPARATUS, AND METHOD OF CONTROLLING FOR ANALYZING STATE INFORMATION

CROSS-REFERENCE TO RELATED APPLICATIONS

This application claims priority under 35 U.S.C. §119 from Korean Patent Application No. 2012-0113125, filed in the Korean Intellectual Property Office on Oct. 11, 2012, the disclosure of which is incorporated herein by reference.

BACKGROUND OF THE INVENTION

1. Field of the Invention

Methods and apparatuses consistent with the exemplary embodiments relate to a print controlling terminal apparatus, print controlling method, image forming apparatus and method of controlling the same.

2. Description of the Related Art

A host apparatus, for example a PC, is connected to an image forming apparatus (for example, a printer, scanner, complexer, facsimile, etc.) and periodically collects state information of the image forming apparatus. In addition, the host apparatus displays a notification message using the collected state information.

An operating system in a host apparatus sometimes provides a notification control function by itself. When the operating system is providing a notification control function by itself, it is possible to set up the operating system such that a notification message is only displayed on a screen at certain increments of time, for example, 1 hour, 3 hours, and 8 hours etc. In addition, when controlling a notification setting, it is possible to change a corresponding function setting by setting a notification message for application units (such as Metro applications, or "Metro apps") on or off. That is, in a case of a control menu which the operating system provides, it is possible to control determination of application units only.

However, in a case of an image forming apparatus, it is not possible to know which application it would be loaded and operated on, and thus there was a problem that it was impossible to control the notification setting with only setting application units on or off.

However, conventional messages are generated in response to all events defined in a driver event module, and thus it is impossible to determine a level of event that a user wants to be notified of, nor set a level such that only messages above the set level are displayed.

In addition, in conventional notification setting, in a case where it is connected by means of a TCP/IP to a host apparatus and image forming apparatus, a network packet is polled in periods defined in a Bidi XML for the notification function. Accordingly, since the image forming apparatus must switch out of a power saving mode when it receives a state information request signal of the host apparatus, there is a problem of an increase in electricity consumption.

SUMMARY OF THE INVENTION

The print controlling terminal apparatus, print controlling method, image forming apparatus and control method thereof according to the present disclosure may predetermine notification messages according to the driver of the image forming apparatus, and may turn the state information analyzing operation of the image forming apparatus on or off, thereby maintaining power saving mode, and classifying and displaying the messages according to a level of the messages.

Additional features and utilities of the present general inventive concept will be set forth in part in the description which follows and, in part, will be obvious from the description, or may be learned by practice of the general inventive concept.

According to an exemplary embodiment of the present inventive concept, a print controlling terminal apparatus connectable to an image forming apparatus may include a user interface unit which inputs a set value which predetermines whether or not to activate an operation of analyzing a state information of the image forming apparatus; a storage unit which stores the input set value; a print data generating unit which generates print data including the set value and spools the generated print data to the image forming apparatus; and a control unit which generates a notification message using the received state information according to the set value.

The set value may include a value which selects a setting of activating the state information analyzing operation or a setting of deactivating the state information analyzing operation, and the setting which activates the state information analyzing operation may select the state information according to a level of the state information.

A first level of the state information may be an error state, and a second level of the state information may be a warning state.

The control unit may generate the notification message, if the set value stored in the storage unit is a setting of activating the state information analyzing operation.

The control unit may generate the notification message based on the received state information if the received state information is the same as or lower than a level of the state information predetermined by the set value.

According to an exemplary embodiment of the present inventive concept, a print controlling method of a print controlling terminal apparatus connectable to an image forming apparatus may include inputting a set value which predetermines whether or not to activate a state information analyzing operation of the image forming apparatus; storing the input set value; generating print data including the set value and spooling the generated print data; and receiving the state information, and generating a notification message using the received state information according to the set value.

The set value may include a setting of activating the state information analyzing operation or a setting of deactivating the state information analyzing operation, and the setting of activating the state information analyzing operation may select the state information according to a level of the state information.

The generating the notification message may include determining whether or not the stored set value is for activating the state information analyzing operation; if the stored set value is for activating the state information analyzing operation, comparing the received state information and the level of the state information predetermined by the set value; and if the received state information is the same or lower than the level of the state information predetermined by the set value, generating the notification message based on the received state information.

According to an exemplary embodiment of the present inventive concept, an forming apparatus connectable to a print controlling terminal apparatus may include an input unit which inputs a set value which determines whether or not to activate a state information analyzing operation; a communication unit which receives print data from the print controlling terminal apparatus; a print unit which performs a print operation using the received print data; and a control unit which determines whether or not to execute the state information analyzing operation according to the input set value, if a request for state information is received from the print controlling terminal apparatus.

The set value may include a value which selects a setting of activating the state information analyzing operation or a setting of deactivating the state information analyzing operation, and the setting of activating the state information analyzing operation includes a plurality of values which may select the state information according to a level of the state information.

The set value may be changed to a set value included in print data received from the print controlling terminal apparatus.

The control unit may analyze state information according to a state information request signal received periodically from the print controlling terminal apparatus, if the set value is a setting of activating the state information analyzing operation.

The control unit may generate predefined state information if the control unit does not perform the state information analyzing operation after receiving the state information request signal from the print controlling terminal apparatus.

According to an exemplary embodiment of the present inventive concept, a controlling method of an image forming apparatus connectable to a print controlling terminal apparatus may include inputting a set value which determines whether or not to activate a state information analyzing operation; receiving print data; performing a print operation using the received print data; and if a state information request is received from the print controlling terminal apparatus, determining whether or not to execute the state information analyzing operation according to the input set value.

The set value may include a setting of activating the state information analyzing operation or a setting of deactivating the state information analyzing operation, and the setting of activating the state information analyzing operation may consist of a plurality of values which may select the state information according to a level of the state information.

The set value may be changed to a set value included in print data received from the print controlling terminal apparatus.

The determining whether or not to execute the state information analyzing operation may include analyzing state information according to a state information request signal periodically received from the print controlling terminal apparatus, if it is determined that the input set value is a setting of activating the state information analyzing operation; and generating state information according to the result of analyzing.

The determining whether or not to execute the state information analyzing operation may include generating predefined state information if it is determined that the input set value is a setting of deactivating the state information analyzing operation.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 5 is a view explaining a screen for inputting a notification setting function displayed on a display unit of a print controlling terminal apparatus according to an exemplary embodiment of the present inventive concept;

DETAILED DESCRIPTION OF THE PREFERRED EMBODIMENTS

Figure 1:
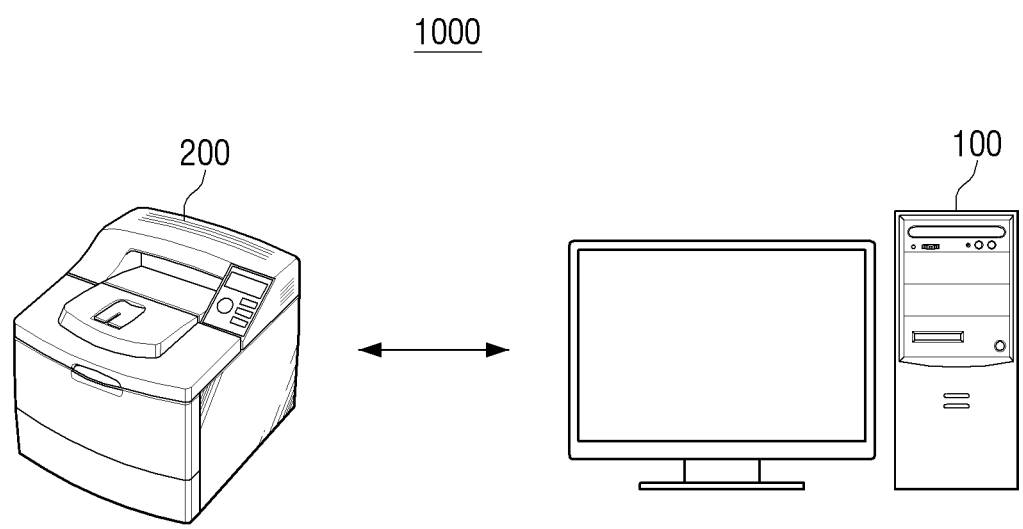
FIG. 1 is a conceptual view which explains an image forming system according to an exemplary embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a conceptual view explaining an image forming system according to an exemplary embodiment of the present inventive concept.

With reference to FIG. 1, the image forming system 1000 includes a print controlling terminal apparatus 100 and image forming apparatus 200.

A print controlling terminal apparatus 100 may be a PC (personal computer), PDA (Personal Digital Assistant), smart phone, laptop, and smart pad etc. Such a print controlling terminal apparatus 100 may be connected with the image forming apparatus 200 through a wired or wireless method. In a wired communication method, a communication interface may be performed through a USB, a wired LAN, etc. In a wireless communication method, a communication interface may be a wireless LAB, etc.

Such a print controlling terminal apparatus 100 generates print data, spools the generated print data in a spooler, and transmits the spooled print data to the image forming apparatus 200. Herein, the print controlling terminal apparatus 100 includes a set value regarding whether or not to perform a state information analyzing operation (or an operation of analyzing state information (or figuring state information out) in the print data, and transmits the result. That is, the print controlling terminal apparatus 100 transmits a state information request signal to the image forming apparatus 200 periodically, and the image forming apparatus 200 performs a state information analyzing operation to collect the state information, and transmits the result to the print controlling terminal apparatus 100.

A set value is input into the print controlling terminal apparatus 100 by a user, and the set value herein is a value to control whether or not to perform a state information analyzing operation.

The print controlling terminal apparatus 100 periodically receives state information and print operation information of the device from the image forming apparatus 200. In addition, the print controlling terminal apparatus 100 generates a notification message based on the state information received from the image forming apparatus 200. Herein, the print controlling terminal apparatus 100 generates a notification message corresponding to the state information received from the image forming apparatus 200 according to the set value predetermined by the user and displays the result.

The image forming apparatus 200 performs a print operation using print data. Such an image forming apparatus 200 may be one of various types of apparatuses such as inkjet printer, laser printer, scanner, complexer, facsimile, etc. Such an image forming apparatus 200 receives a print control signal by the print controlling terminal apparatus, and performs a print operation according to the control signal. Such an image forming apparatus 200 receives a state information request signal periodically from the print controlling terminal apparatus 100, and performs a state information analyzing operation in response to the received state information request signal. When performing a state information analyzing operation, the image forming apparatus 200 senses whether or not there is a corresponding print job, a state of a constituent element of the image forming apparatus 200, and generates state information corresponding thereto. The image forming apparatus 200 transmits the generated state information to the print controlling terminal apparatus 100. In addition, when the print operation is completed, the image forming apparatus 200 may generate a print operation completion message, include the message in the state information, and transmit the result to the print controlling terminal apparatus 100.

Figure 2:
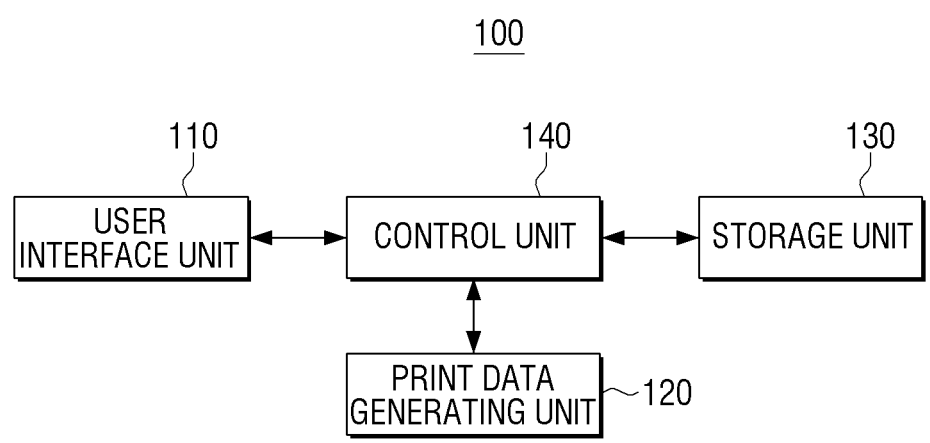
FIG. 2 is a block diagram explaining a print controlling terminal apparatus according to an exemplary embodiment of the present inventive concept.

FIG. 2 is a block diagram explaining a print controlling terminal apparatus according to an exemplary embodiment of the present inventive concept. With reference to FIG. 2, the print controlling terminal apparatus 100 includes a user interface unit 110, print data generating unit 120, storage unit 130, and control unit 140.

The user interface unit 110 is an input means for a user to input a set value including setting information on whether or not to perform a state information analyzing operation in the image forming apparatus 200. That is, the user interface unit 110 may be embodied for example by a touch screen, and a set value may be input for example by the user's touch operations. Such a user interface unit 110 may be embodied together with a display unit (not illustrated) provided in the print controlling terminal apparatus 100, and a set value may be input by the user's touch operation. Otherwise, the user interface unit 110 may have an additional screen, and be embodied as an input device for inputting letters, numbers, figures, and symbols etc.

In a case of an exemplary embodiment embodied as a touch screen, the user interface unit 110 may be embodied as a user interface window as illustrated in FIG. 5. Detailed explanation of such a user interface window will be explained in further detail hereinbelow with reference to FIG. 5.

FIG. 5 is a view explaining a screen for inputting a notification setting function displayed on a display unit of a print controlling terminal apparatus according to an exemplary embodiment of the present inventive concept.

With reference to FIG. 5, the user interface window 500 where setting functions are displayed on a display unit includes Basic, Advanced, Security, and About items.

When the Security item is selected, it can be seen that the item consists of an item 510 for inputting a print job accounting, user ID, and password etc., and an item 520 consisting of notification setting and notification types.

The notification type items include a state notification item (Error; 521), Error and Warning notification item (522), and an inactivation item (None; 523). When the user selects at least one of the notification type items through the user interface unit 110, the corresponding item is selected as a set value, and stored in the storage unit 130.

Examples of error states include DoorOpen, MarkerFailure, MarkerSupplyEmpty, MediaEmpty, OutputAreaFull etc. Examples of Warning states include MarkerSupplyLow, MediaLow, OutputAreaAlmostFull etc.

Returning to FIG. 2, the print data generating unit 120 generates print data which may perform a print operation in the image forming apparatus 200. Herein, the print data is expressed in page description language. Herein, the page description language is a language for explaining contents of a page to be printed in an upper level than the actual bitmap output. Examples of such a page description language are PDL (Page Description Language), PCL (Printer Command Language), SPL (Samsung Page Language) etc. The print data generating unit 120 may be generated including the set value input by the user interface unit 110 in the print data. That is, the set value input through the interface unit 110 is added to the PJL (Printer Job Language) command within a prn file (a file containing instructions for an image forming apparatus such as a printer).

If the user selects Error or Error and Warning as the set value, the added command may be expressed as "@PJL SET NOTIFICATION=ON". In addition, if the user selects None as the set value, the added command may be expressed as "@PJL SET NOTIFICATION=OFF".

The print data generating unit 120 includes the set value which determines whether or not to activate the state information analyzing operation of the image forming apparatus 200 and spools the result to the image forming apparatus 200.

The storage unit 130 stores the set value input by the user through the user interface unit 110. The storage unit 130 may include the set value in the print data created in the print data generating unit 120 for each job of the image forming apparatus 200 and store the result. For example, the set value includes items such as Error state notification setting, Error and Warning state notification setting, inactivation setting (None), etc. As such any one of the three items may be embodied as the set value. Otherwise, the items may be embodied to be three or more, and two or more items may be stored.

The control unit 140 determines whether or not to generate a notification message based on the set value stored in the storage unit 130. That is, in the case where the pre-stored set value is an error and warning state notification setting, the control unit 140 analyzes the state information received from the image forming apparatus 200, and generates a notification message according to the type of the analyzed state information.

The set value may consist of a setting of activating or deactivating the state information analyzing operation of the image forming apparatus 200. The case where the error state notification setting and error and warning state notification setting are stored as the state value, the set value is the setting of activating the state information analyzing operation of the image forming apparatus 200. In the case where the aforementioned inactivation setting (None) is stored as the state value, the set value is the setting of deactivating the state information analyzing operation of the image forming apparatus 200.

Herein, the setting of activating the state information analyzing operation may consist of a plurality of items so as to select the state information of the image forming apparatus 200 according to the level of the state information. For example, the setting of activating the state information analyzing operation may consist of error state notification setting (first level) and warning state notification setting (second level) items.

When it is determined that the set value stored in the storage unit 130 is a setting of activating the state information analyzing operation, the control unit 140 generates a notification message based on the received state information. That is, when the print controlling terminal apparatus 100 receives error state information from the image forming apparatus 200, the control unit 140 generates a notification message based on the error state information, and displays the result.

Otherwise, the control unit 140 compares the level of the state information received from the image forming apparatus 200 received from the image forming apparatus 200 with the level of the state information set by the set value. For example, if the level of the set value is a first level and the level of the received state information is a second level, the control unit 140 determines that the level of the received state information is higher than the set value and does not generate a notification message based on the received state information. Otherwise, if the level of the input set value is a second level, and the level of the received state information is a first level, the control unit 140 determines that the level of the received state information is lower than the set value, and generates a notification message based on the received state information.

That is, the control unit 140 may or may not generate a notification message regarding the received state information according to the level of the input set value. The user may set the notification setting of the print controlling terminal apparatus 100 per driver of the image forming apparatus 200. In addition, the control unit 140 may compare the level of the event which occurs in the image forming apparatus 200 with the level of the input set value, and control whether or not to generate a notification message.

In addition, the print controlling terminal apparatus 100 according to the present exemplary embodiment of the inventive concept periodically transmits a state information request signal to the image forming apparatus 200. Such a state information request signal is a function which is basically provided from the operating system of the print controlling terminal apparatus 100, which the user of the image forming apparatus 200 cannot control. Therefore, the image forming apparatus 200 cannot maintain a power saving mode due to the periodic state information request signals of the print controlling terminal apparatus 100, and so there is excessive power consumption.

However, according to the exemplary embodiments of the present inventive concept, in the case of receiving an input of the setting of deactivating the state information analyzing operation of the image forming apparatus 200, this may be included in print data and transmitted to the image forming apparatus 200. The image forming apparatus 200 which received the deactivating setting as a set value together with the print data does not perform the state information analyzing operation of the image forming apparatus 200, despite state information request signals received periodically from the print controlling terminal apparatus 100. As a result, the power saving mode can be maintained.

That is, the print controlling terminal apparatus 100 of the present inventive concept may set the state information analyzing operation of the image forming apparatus 200 to a deactivation mode. Therefore, the image forming apparatus 200 where the state information analyzing operation is in such a deactivation mode does not perform the state information analyzing operation even when it receives a state information request signal from the print controlling terminal apparatus 100 during power saving mode, and thus it does not break away from the power saving mode, resulting in a significant power saving effect.

Figure 3:
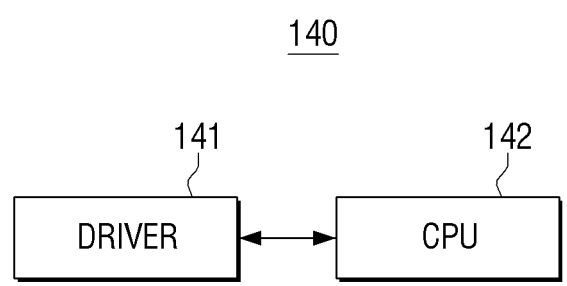
FIG. 3 is a block diagram illustrating a specific configuration of a control unit illustrated in FIG. 2.

FIG. 3 is a block diagram explaining a more detailed description of the control unit 140 illustrated in FIG. 2.

With reference to FIG. 3, the control unit 140 includes a driver 141 and a CPU (Central Process Unit; 142).

The driver 141 receives a two-way message from the image forming apparatus 200, and transmits the message to the CPU 142.

The CPU 142 performs the overall operations of the control unit 140. That is, the CPU 142 controls the print controlling terminal apparatus 100 to read the subject document to be printed, convert it to print data, and transmit it to the image forming apparatus 200, according to a command from the operating system of the print controlling terminal apparatus 100.

The CPU 142 processes calculations so as to perform all types of functions which can be supported in the operating system (OS). For example, an application which may be supported in the OS may directly manage the image forming apparatus 200 and receive the state information of the image forming apparatus 200. In this case, the driver 141 is necessary to use the printing notification function of the image forming apparatus 200, and also there must exist a two-way XML file which defines that an event is an event of the image forming apparatus 200.

The CPU 142 according to an exemplary embodiment of the present inventive concept supports the Metro user interface (UI) in the OS, but is not limited to the Metro UI. A process of setting a set value through the UI will be explained in more detail with reference to FIG. 6.

Figure 6:
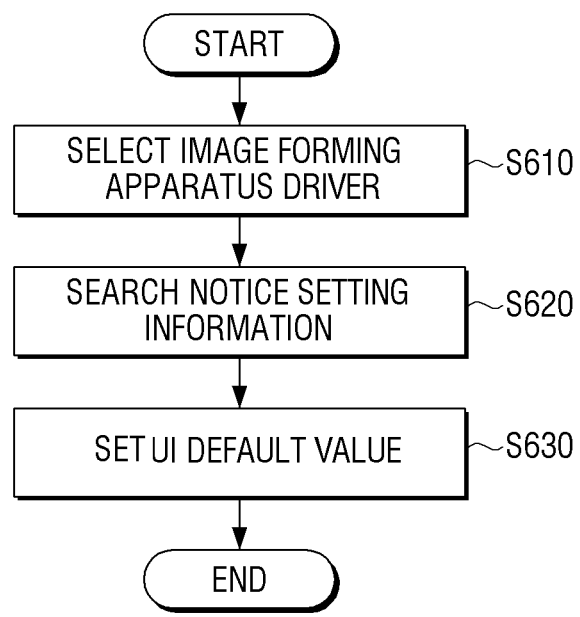
FIG. 6 is a flowchart explaining a process for setting a default value in a user interface (UI) of among a print controlling method according to another exemplary embodiment of the present inventive concept.

FIG. 6 is a flowchart explaining the process of setting a default value in the UI of the print controlling method according to another exemplary embodiment of the present inventive concept.

With reference to FIG. 6, the CPU 142 executes the UI. Herein, the UI is a type of a broad area application which is provided in the OS and supported in the print controlling terminal apparatus 100. An example of such a UI is the Metro UI, in which a plurality of applications are displayed on a screen in a mobile mode before the OS operates in a PC mode. The UI is executed by the CPU 142, and the driver 141 to be used is selected in the image forming apparatus 200 (operation S610).

Notification setting information which may be applied to the selected driver 141 is searched for (operation S620). That is, for example, when a selecting option, MoreSetting, is input in the UI, a screen for inputting a notification setting function, illustrated in FIG. 5, is displayed. With reference to the user interface window 500 illustrated in FIG. 5, the searched notification setting information options in the driver 141 of the image forming apparatus 200 may include an error state notification setting, error and warning state notification setting and deactivating setting items.

When a user selects at least one of the searched notification setting information, the selected item is set as the UI default value regarding the driver 141 of the corresponding image forming apparatus 200 (operation S630). At the point where the screen for inputting a notification setting function is displayed, the CPU 142 controls the UI to attempt an auto configuration. The corresponding value can be confirmed on the web through http://10.88.189.127/printdriver/autoconfig.xml. Herein, 10.88.189.127 is an IP address of an exemplary image forming apparatus 200. The corresponding XML file at this IP address shows the set values of the current image forming apparatus 200. The CPU 142 obtains information on notification from the obtained XML file.

That is, the set value regarding notification may be recorded in the XML file in a format of <Config ID="Notification" VALUE=FALSE/>, wherein VALUE is as explained as follows:

When VALUE=FALSE, a deactivating setting (None) is input as the set value. Conversely, when VALUE=TRUE, an error state notification setting or error and warning state notification setting is input as a set value. When the AutoConfig item is FALSE, on the UI screen a deactivating setting (None) item is selected and shown, whereas when AutoConfig items is TRUE, on the UI screen an error state notification setting item is selected and shown.

The process of including the set value input through the UI in print data and transmitting it to the image forming apparatus 200 is explained as follows with reference to FIG. 7.

Figure 7:
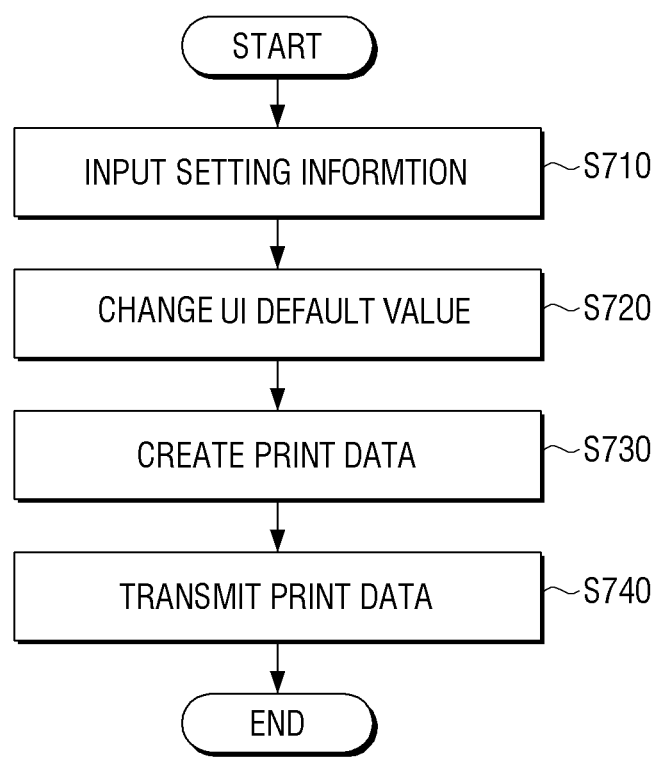
FIG. 7 is a flowchart explaining a process of transmitting a set value and print data of among a print controlling method according to an exemplary embodiment of the present inventive concept.

FIG. 7 is a flowchart explaining a process of transmitting a set value and print data in a print controlling method according to another exemplary embodiment of the present inventive concept.

With reference to FIG. 7, setting information including the set value for determining whether or not to activate the state information operation of the image forming apparatus 200 by the user is input in the UI setting window (operation S710).

The UI default value pre-stored in the storage unit 130 is changed to a newly input set value and is stored (operation S720).

Print data which includes the input set value is generated (operation S730).

The driver 141 adds the set value input from the user to the PJL command within a prn file through the user interface window displayed on the UI to generate print data, and transmits the generated print data to the image forming apparatus 200 (operation S740).

The CPU 142 displays the two-way event message input through the driver 141 via the spooler, explorer, system event broker of the print controlling terminal apparatus 100, and then on the display unit 160, using the OS.

Figure 4:
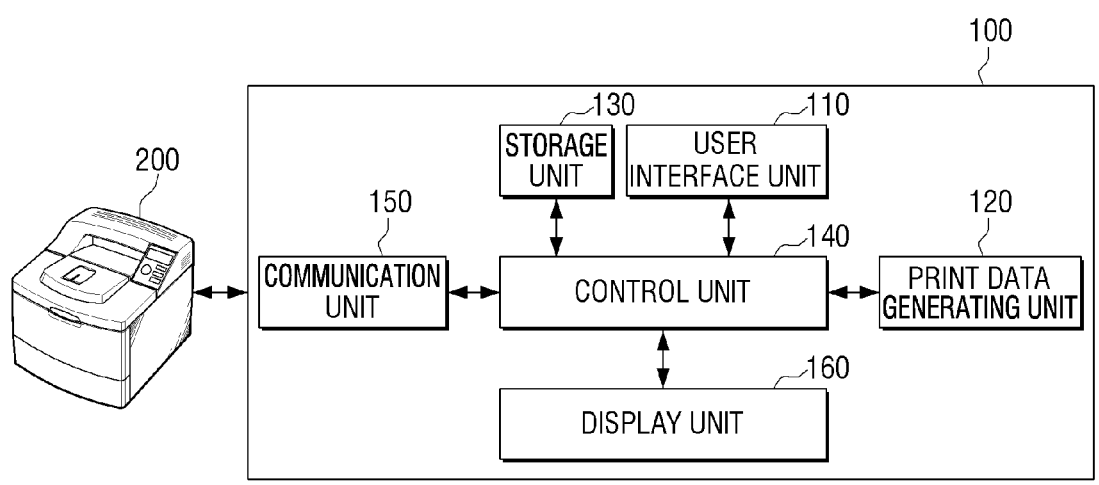
FIG. 4 is a block diagram explaining a print controlling terminal apparatus according to an exemplary embodiment of the present inventive concept, in further detail.

FIG. 4 is a block diagram explaining the print controlling terminal apparatus in further detail according to an exemplary embodiment of the present inventive concept.

With reference to FIG. 4, the print controlling terminal apparatus 100 according to an exemplary embodiment of the present inventive concept performs communication with the image forming apparatus 200 through the communication unit 150. In addition, the print controlling terminal apparatus 100 may include a user interface unit 110, print data generating unit 120, storage unit 130, control unit 140, communication unit 150, and display unit 160.

The user interface unit 110 receives a set value which determines whether or not to execute the state information analyzing operation in the image forming apparatus 200.

The print data generating unit 120 generates print data for printing a document in the image forming apparatus 200. Herein, the print data generating unit 120 may generate print data including the set value input in the print data.

The storage unit 130 stores the set value input through the user interface unit 110 and the print data generated in the print data generating unit 120. In addition, the storage unit 130 may store the state information received from the image forming apparatus 200.

The control unit 140 may include a driver 141 and CPU 142, as illustrated in FIG. 3. It may further include a RAM (Random Access Memory, not illustrated) and ROM (Read Only Memory, not illustrated).

The control unit 140 may compare the state information received from the image forming apparatus 200 with the set value input by the user, and generate a notification message regarding the state information. In a case where the set value is a deactivating setting, the control unit 140 does not generate a notification message using the state information received from the image forming apparatus 200.

The control unit 140 controls the user interface unit 110 and display unit 160 so as to receive an input of the set value from the UI. The set value selected in the UI may be applied as a basic setting in the driver of the corresponding image forming apparatus 200.

In addition, the control unit 140 analyzes the state information received from the image forming apparatus 200, and generates various notification messages in response to the corresponding state information. The process of generating a notification message in the control unit 140 will be explained hereinbelow with reference to FIG. 8.

Figure 8:
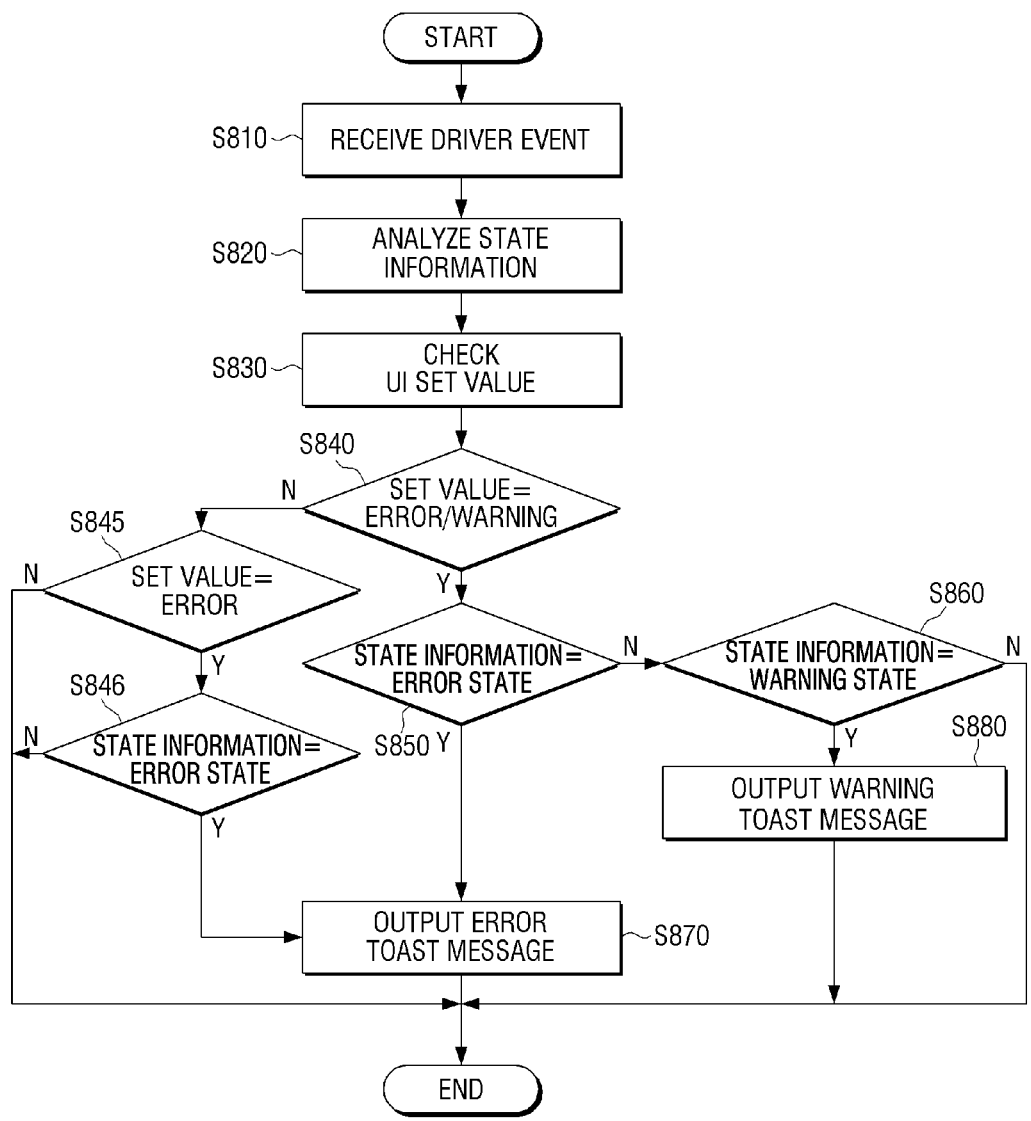
FIG. 8 is a flowchart explaining a method of outputting a toast message in a print controlling method according to another exemplary embodiment of the present inventive concept.

FIG. 8 is a flowchart explaining a method of outputting a toast message in the print controlling method according to another exemplary embodiment of the present inventive concept. For the purposes of this description, a "toast message" comprises a short message giving a user simple feedback about an operation, e.g. "error."

With reference to FIG. 8, the print controlling terminal apparatus 100 periodically transmits a state information request signal to the image forming apparatus 200. The print controlling terminal apparatus 100 receives a driver event from the image forming apparatus (operation S810). That is, the image forming apparatus 200 understands the state information in response to the state information request signal which is periodically and automatically generated in the OS of the print controlling terminal apparatus 100, and when a driver event of the image forming apparatus 200 occurs, the image forming apparatus 200 transmits the driver event to the print controlling terminal apparatus 100.

In operation S820, the print controlling terminal apparatus 100 analyzes the received driver event. Specifically, the print control terminal 100 analyzes the state information of the image forming apparatus 200, to ascertain whether it is an error state, warning state, or other state.

The print controlling terminal apparatus 100 checks the characteristics of the pre-stored UI set value (operation S830). That is, the print controlling terminal apparatus 100 calls the set value stored in the storage unit 130 and checks the setting information of the corresponding set value. Herein, the set value has a value which belongs to at least one of an error state notification setting, error and warning state notification setting, and deactivating setting.

The print controlling terminal apparatus 100 determines whether or not the set value is an error and warning state notification setting (operation S840). If the set value is an error and warning state notification setting (S840-Y), the print controlling terminal apparatus 100 determines whether the state information is an error state (operation S850). If the state information is an error state (S850-Y), the print controlling apparatus 100 generates and outputs an error toast message (operation S870). If instead the state information is not in an error state (S850-N), the print controlling terminal apparatus 100 determines whether the state information is a warning state (operation S860). When it is determined that the state information is a warning state (S860-Y), the print controlling terminal apparatus 100 generates and outputs a warning toast message (operation S880). If the state information is not a warning state (S860-N), it does not generate a toast message.

When the set value is not an error and warning state notification setting (S840-N), the print controlling terminal apparatus 100 determines whether or not the set value is an error state notification setting (operation S845). If the set value is not an error state notification setting (S845-N), the print controlling terminal apparatus 100 does not generate a toast message. If the set value is an error state notification setting (S845-Y), the print controlling terminal apparatus 100 determines whether or not the state information is an error state (operation S846). If it is determined that the state information is an error state (S846-Y), the print controlling terminal apparatus 100 generates and outputs an error toast message (operation S870). If it is determined that the state information is not an error state (S846-N), the print controlling terminal apparatus 100 does not generate a toast message.

Returning to FIG. 4, the communication unit 150 transmits print data to the image forming apparatus 200, and receives state information from the image forming apparatus 200. Such a communication unit 150 may be embodied as at least one of USB (Universal Serial Bus) communication and SNMP (Simple Network Management Protocol) communication.

The display unit 160 displays the notification message generated based on the state information received from the image forming apparatus 200. In addition, the display unit 160 may include a touch panel, and may perform the functions of the user interface unit 110 at the same time by displaying the user interface window.

Figure 9:
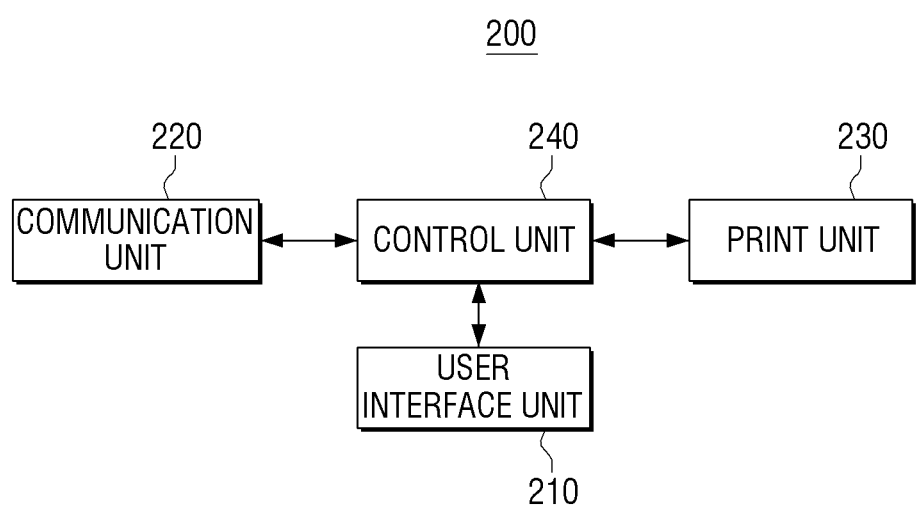
FIG. 9 is a block diagram explaining an image forming apparatus according to another exemplary embodiment of the present inventive concept.

FIG. 9 is a block diagram explaining the image forming apparatus according to another exemplary embodiment of the present inventive concept.

With reference to FIG. 9, the image forming apparatus 200 includes a user interface unit 210, communication unit 220, print unit 230, and control unit 240.

Figure 10:
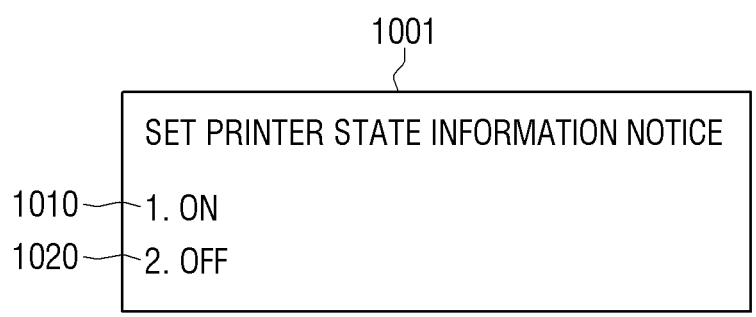
FIG. 10 is a view illustrating an example of a user interface window for inputting a state information notification setting which may be displayed on a user interface unit.

The user interface unit 210 enables a user to input a set value which determines whether or not to activate the state information analyzing operation. Herein, the set value may be set as ON or OFF. When the set value is ON, it is an activating setting mode of the state information analyzing operation of the image forming apparatus 200. When the set value is OFF, it is a deactivating setting mode of the state information analyzing operation of the image forming apparatus 200. An example of the user interface window of the user interface unit 210 is illustrated in FIG. 10 described in detail below.

The image forming apparatus 200 according to the present inventive concept may further include a display unit. The display unit of the image forming apparatus 200 may be embodied to display a screen for inputting notification setting functions as illustrated for example in the user interface window 500 of FIG. 5.

That is, the user interface unit 210 of the image forming apparatus 200 may be configured to allow the user to easily turn the state information analyzing operation on or off. To this end, the user interface unit 240 may be embodied as various types of input means for a user of the image forming apparatus 200 to input a set value, such as the setting information regarding whether or not to perform the state information analyzing operation. For example the user interface unit 210 may be embodied by a touch screen, on which a set value may be input by a touch operation by the user.

Herein, the set value may consist of a value for selecting a setting of activating the state information analyzing operation and a setting for deactivating the state information analyzing operation. The setting for activating the state information operation may consist of a plurality of values for selecting a particular level of state information.

Such a user interface unit 210 may be embodied together with a display unit (not illustrated) provided in the image forming apparatus 200. Otherwise, the user interface unit 210 may be embodied to include an additional screen and as an input device such as a keyboard for inputting letters, numbers, figures, and symbols etc.

The communication unit 220 receives print data which includes print data or set value from the print controlling terminal apparatus 100.

The print unit 230 performs print operations using the received print data. For example, in a case where the image forming apparatus 200 is performing a color laser printing process, the image forming process goes through the process of charging, writing, developing, transferring and fusing, and prints images. Herein, charging refers to a process of approving high voltage (about 7000V) to a charger, to enable that (−) charges are generated on a visual receptor by a Corona charging. Writing refers to a process of forming a latent image by injecting laser beam on the surface of the visual receptor where (−) charges are generated and eliminating (−) charges in letter form. Developing refers to a process of enabling toner particles having (−) components to attach to the latent portion of the visual receptor. Transferring refers to a process of approving a predetermined transcription voltage to a transcriber when paper passes between the visual receptor and transcriber, thereby forming (+) charges in the paper, so as to draw the (−) toner particles formed on the drum surface towards the direction of the paper. Next, fusing refers to a process of applying an adequate amount of heat and pressure on the paper to completely fuse the toner to the paper. After this entire process, images are formed on the paper to be output.

The control unit 240 controls whether or not to execute the state information analyzing operation of the image forming apparatus 200 according to the state information request received from the print controlling terminal apparatus 100.

The control unit 240 may change the set value input through the image forming apparatus 200 to the set value received from the print controlling terminal apparatus 100.

When it is determined that the set value is a setting for activating the state information analyzing operation, the control unit 240 performs the state information analyzing operation according to the state information request signal received periodically from the print controlling terminal apparatus 100, and generates the state information.

If it is determined that the set value is a setting for deactivating the state information analyzing operation, the control unit 230 does not perform the state information analyzing operation even if it periodically receives the state information request signal from the print controlling terminal apparatus 100.

In addition, the control unit 240 receives the state information request signal from the print controlling apparatus 100, and generates the predefined state information. Herein, the predefined state information relates to other state information besides error state and warning state.

FIG. 10 is a view illustrating an example of the user interface window for inputting the state information notification setting which may be displayed on the user interface unit of FIG. 9.

With reference to FIG. 10, the user interface window 1001 for inputting the set value may include an item 1010 for selecting ON and an item 1020 for selecting OFF. The user interface window 1001 for the printer state information notification setting illustrated in FIG. 10 is an example, and may include other features as well.

Figure 11:
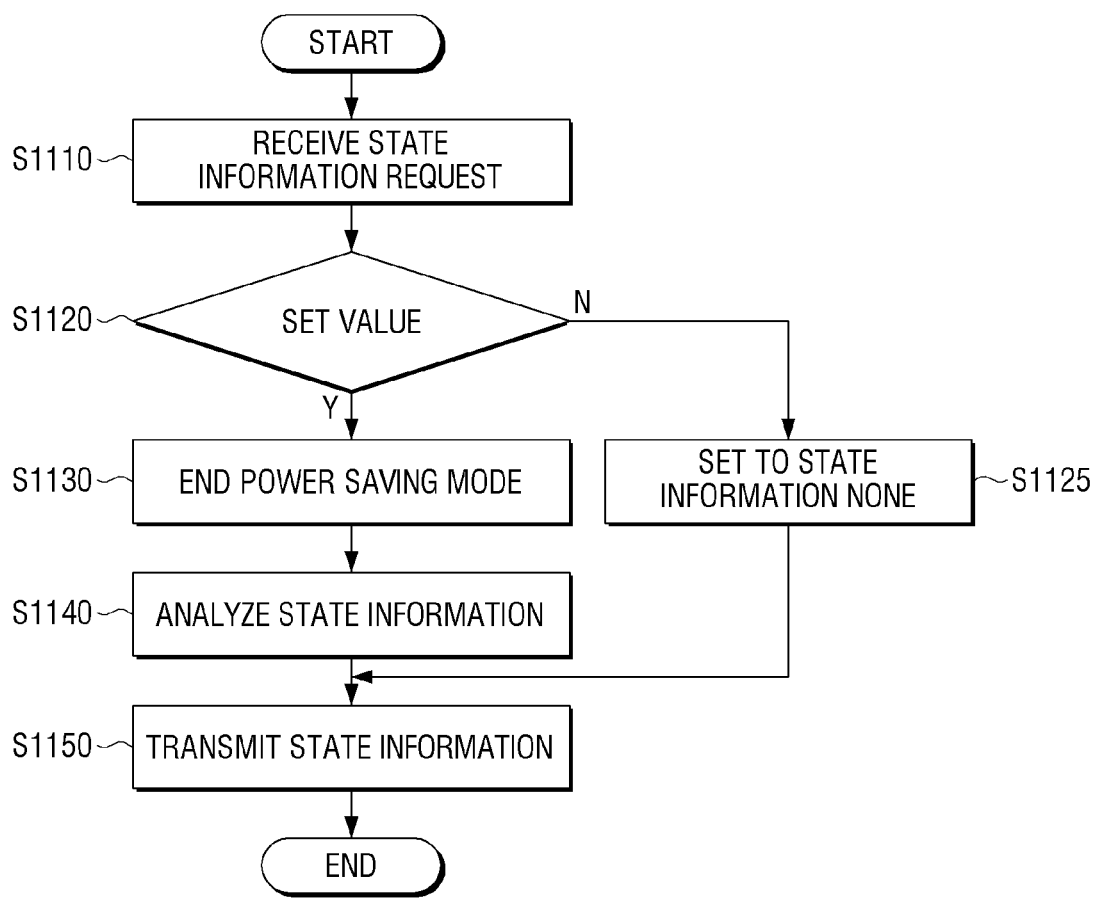
FIG. 11 is a flowchart explaining a controlling method of an image forming apparatus according to another exemplary embodiment of the present inventive concept.

FIG. 11 is a flowchart explaining a method of controlling the image forming apparatus 200 according to another exemplary embodiment of the present inventive concept.

With reference to FIG. 11, the print controlling terminal apparatus 100 periodically generates a state information request signal, which the image forming apparatus 200 receives in operation S1110.

The image forming apparatus 200 determines whether or not the set value is ON (operation S1120). If the set value is ON (S1120-Y), and is in a power saving mode, the image forming apparatus 200 ends the power saving mode (operation S1130). That reason that the image forming apparatus 200 ends the power saving mode is to initiate the state information analyzing operation. That is, if the set value of the state information analyzing operation of the image forming apparatus is set ON, the state information request signal received from the print controlling terminal apparatus 100 acts as a trigger signal for stating the state information analyzing operation.

The image forming apparatus 200 analyzes the state information regarding its constituent elements (operation S1140). That is, the image forming apparatus 200 senses various states related to the state of the image forming apparatus 200 such as whether or not to end printing, number of sheets to be printed, state of printing operation, number of pieces of paper, toner information, etc., and then outputs the sensed state as state information.

The image forming apparatus 200 transmits the output state information to the print controlling terminal apparatus 100 (operation S1150).

However, if the set value is OFF (S1120-N), the image forming apparatus 200 allocates the predefined NONE value and generates corresponding state information (operation S1125). The image forming apparatus 200 accordingly transmits NONE value as state information (operation S1150).

A method of controlling the image forming apparatus 200 according to another exemplary embodiment of the present inventive concept performs an operation of inputting the set value which determines whether or not to activate the state information analyzing operation. The image forming apparatus 200 receives print data from the terminal apparatus 100, and performs a printing operation using the received print data. When the state information request is received from the print controlling terminal apparatus 100, the image forming apparatus 200 determines whether or not to execute the state information analyzing operation according to the input set value. Herein, the set value may consist of a setting of activating the state information analyzing operation and a setting of deactivating the state information analyzing operation. In addition, the setting of activating the state information analyzing operation may consist of a plurality of values for selecting the state information according to a chosen level of the state information. The set value input as such may be changed to a set value included in the print data received from the print controlling terminal apparatus 100.

When it is determined that the input set value input is a setting for activating the state information analyzing operation, the image forming apparatus 200 may understand the state information according to the periodically received state information request signal and generate state information according to the understood results.

In addition, when it is determined that the input set value is a setting for deactivating the state information analyzing operation, the image forming apparatus 200 may generate predefined state information.

Figure 12:
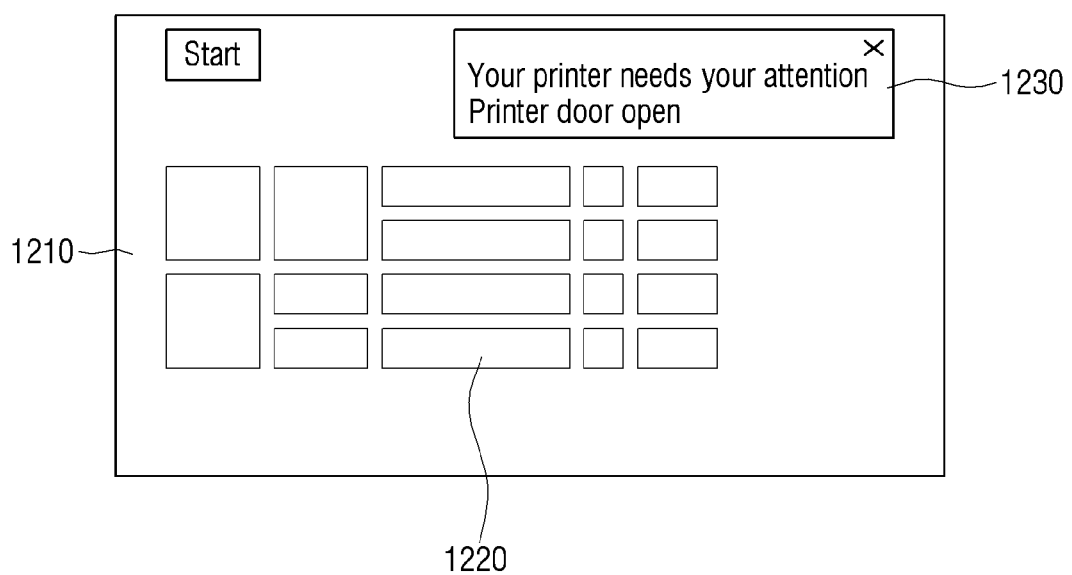

FIG. 12 is a view illustrating an example of a user interface window which may be displayed on the user interface unit.

With reference FIG. 12, a message window 1230 according to an exemplary embodiment of the present inventive concept which notifies the state information may be displayed on the wallpaper 1210 of a new OS. The wallpaper 1210 may consist of an execution area 1220 where a plurality of applications, icons, images, and folders etc. are displayed. More specific explanation on the message window 1230 which notifies state information will be made hereinbelow with reference to FIG. 13

Figure 13:
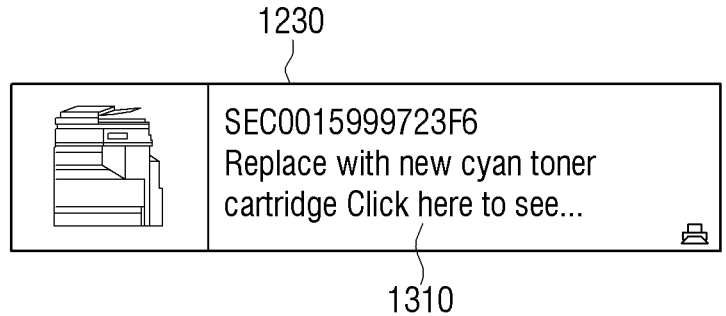
FIG. 13 is a view illustrating an example of a message window which notifies state information illustrated in FIG. 12.

FIG. 13 is a view illustrating an example of the message window 1230 which notifies the state information illustrated in FIG. 12.

With reference to FIG. 13, the message window 1230 includes information on the image forming apparatus 200, designated in this example by serial number SEC0015999723F6, the current state of the image forming apparatus 200, and notification to replace a toner cartridge with a new one etc. In addition, there is an area 1310 for receiving an input of click command, and if the user clicks the corresponding area, more detailed information is displayed.

Figure 14:
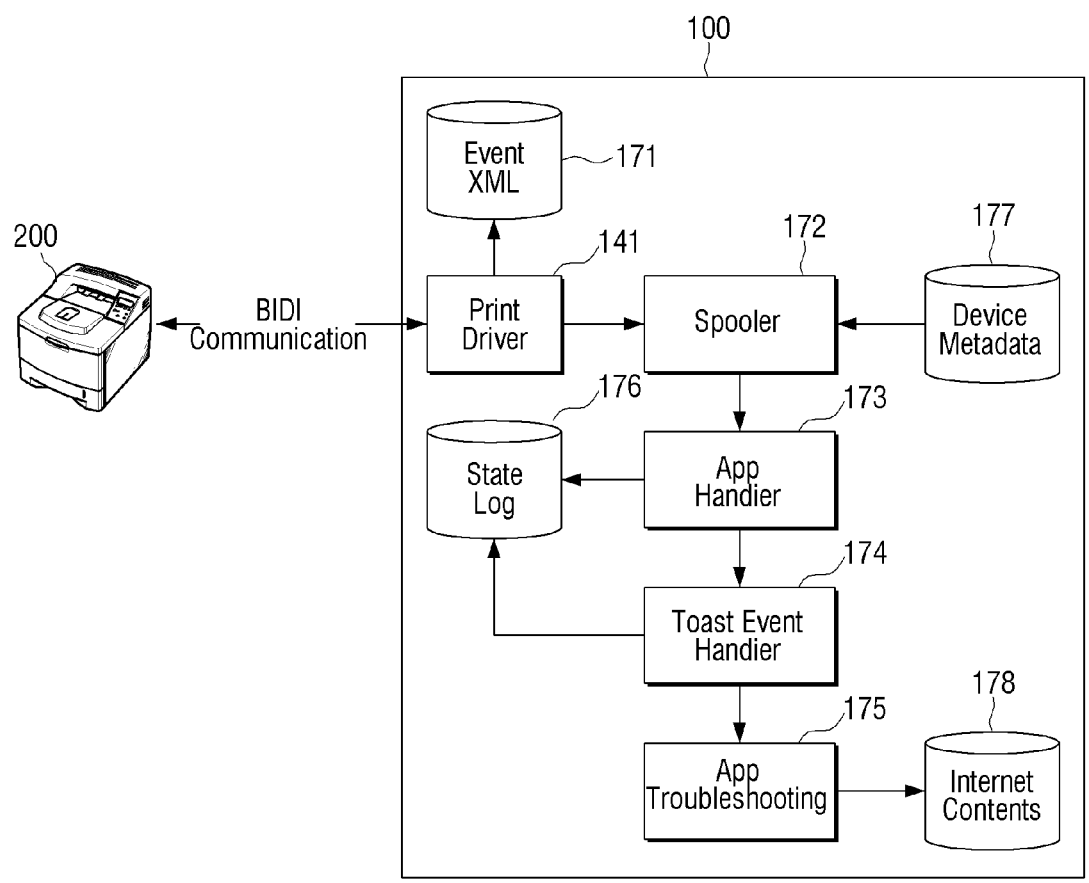
FIG. 14 is a block diagram explaining a process of calling an application in a print controlling terminal apparatus according to an exemplary embodiment of the present inventive concept.

FIG. 14 is a block diagram explaining a process of calling an application in the print controlling terminal apparatus according to an exemplary embodiment of the present inventive concept. The application in FIG. 14 may be a Metro app, or any other analogous application.

With reference to FIG. 14, the print controlling terminal apparatus according to an exemplary embodiment of the present inventive concept includes a repository for storing event XML 171, a print driver 141, a spooler 172, an App handler 173, a toast event handler 174, App troubleshooting 175, a state log 176, apparatus metadata repository 177, internet contents 178, etc. The print controlling terminal apparatus 100 receives the driver event in BIDI communication method through the print driver 141. It determines the driver event in comparison to the XML 171. The print controlling terminal apparatus 100 transmits the determination results to the spooler 172 with device metadata 177, records the result in the state log 176 by means of the App handler 173, and if it is a state to generate to a toast event, it generates the toast event through the toast event handler 174.

More specifically, a code for performing the aforementioned methods may be stored in various types of terminal-readable record media such as RAM, flash memory, ROM, EPROM (Erasable Programmable ROM), EEPROM (Electronically Erasable and Programmable ROM), register, hard disk, removable disk, memory card, USB memory, or CD-ROM.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus connected to a print controlling terminal apparatus, the image forming apparatus comprising:
an input unit which inputs a first set value which determines whether or not to activate an operation of analyzing a state information of the image forming apparatus;
a communication unit which receives print data from the print controlling terminal apparatus;
a print unit which performs a print operation using the received print data; and
a control unit which determines whether or not to execute the operation of analyzing the state information according to the input first set value, if a request for state information is received from the print controlling terminal apparatus,
when a second set value included in the print data is received from the print controlling terminal apparatus, the input first set value is changed to the second set value included in the print data,
wherein the first and second set values includes a value which selects a setting of activating the operation of analyzing the state information or a setting of deactivating the operation of analyzing the state information.

2. The image forming apparatus of claim 1, wherein the setting of activating the operation of analyzing the state information includes a plurality of values which select the state information according to a level of the state information.

3. The image forming apparatus of claim 2, wherein the control unit analyzes state information according to a state information request signal received periodically from the print controlling terminal apparatus, when the first set value is a setting of activating the operation of analyzing the state information.

4. The image forming apparatus of claim 2, wherein the control unit does not perform the operation of analyzing the state information even if a state information request signal is received periodically from the print controlling terminal apparatus, when the first set value is a setting of deactivating the operation of analyzing the state information.

5. The image forming apparatus of claim 4, wherein the control unit generates predefined state information when the control unit does not perform the operation of analyzing the state information after receiving the state information request signal from the print controlling terminal apparatus.

6. A controlling method of an image forming apparatus connected to a print controlling terminal apparatus, the method comprising:
inputting a first set value which determines whether or not to activate an operation of analyzing a state information of the image forming apparatus;
receiving print data from the print controlling terminal apparatus;
performing a print operation using the received print data; and
when a state information request is received from the print controlling terminal apparatus, determining whether or not to execute the operation of analyzing the state information according to the input first set value,
when a second set value included in the print data is received from the print controlling terminal apparatus, the input first set value is changed to the second set value included in the print data,
wherein the first and second set values includes a setting of activating the operation of analyzing the state information or a setting of deactivating the operation of analyzing the state information.

7. The controlling method of claim 6, wherein the setting of activating the operation of analyzing the state information consists of a plurality of values which select the state information according to a level of the state information.

8. The controlling method of claim 7, wherein the determining whether or not to execute the state information analyzing operation comprises:
analyzing state information according to a state information request signal periodically received from the print controlling terminal apparatus, when it is determined that the input first set value is a setting of activating the operation of analyzing the state information; and
generating state information according to the result of analyzing.

9. The controlling method of claim 7, wherein the determining whether or not to execute the state information analyzing operation comprises generating predefined state information when it is determined that the input first set value is a setting of deactivating the operation of analyzing the state information.

* * * * *